Figure 1:
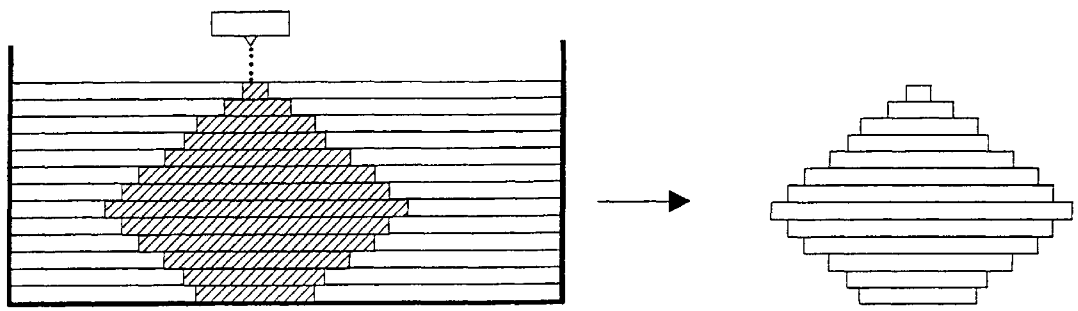

US006147138A

United States Patent [19]

Höchsmann et al.

[11] Patent Number: 6,147,138

[45] Date of Patent: Nov. 14, 2000

[54] METHOD FOR MANUFACTURING OF PARTS BY A DEPOSITION TECHNIQUE

[75] Inventors: Rainer Höchsmann, Friedberg; Ingo Ederer, München, both of Germany

[73] Assignee: Generis GmbH, Germany

[21] Appl. No.: 09/089,444

[22] Filed: Jun. 3, 1998

[30] Foreign Application Priority Data

Jun. 6, 1997 [DE] Germany ........................... 197 23 892

[51] Int. Cl.[7] ................................ B22C 1/10; B22C 1/22

[52] U.S. Cl. ............................................ 523/139; 523/149

[58] Field of Search .................................... 523/139, 149; 264/113, 47, 134; 164/17, 45, 527, 529; 419/64, 65; 427/198, 199

[56] References Cited

U.S. PATENT DOCUMENTS

| | | | |
|---|---|---|---|
| 4,600,733 | 7/1986 | Ohashi et al. | 523/144 |
| 4,711,669 | 12/1987 | Paul et al. | 106/38.51 |
| 4,752,498 | 6/1988 | Fudim . | |
| 5,182,170 | 1/1993 | Marcus et al. . | |
| 5,204,055 | 4/1993 | Sachs et al. | 419/2 |
| 5,324,617 | 6/1994 | Majima et al. . | |
| 5,433,261 | 7/1995 | Hinton et al. | 164/98 |
| 5,518,060 | 5/1996 | Cleary et al. | 164/45 |
| 5,616,631 | 4/1997 | Kiuchi et al. | 523/139 |
| 5,637,175 | 6/1997 | Feying et al. | 156/264 |
| 5,884,688 | 3/1999 | Hinton et al. | 164/527 |

FOREIGN PATENT DOCUMENTS

| | | |
|---|---|---|
| 0 431 924 A2 | 6/1991 | European Pat. Off. . |
| 32 21 357 A1 | 12/1983 | Germany . |
| 3930750C2 | 5/1993 | Germany . |
| WO 95/13565 | 5/1995 | WIPO . |

*Primary Examiner*—Vasu Jagannathan
*Assistant Examiner*—Katarzyna Wyrozebski
*Attorney, Agent, or Firm*—Smith, Gambrell & Russell, LLP; Beveridge, DeGrandi,Wellacher & Young Intellectual Property Group

[57] ABSTRACT

A method for the manufacturing of parts, especially molds or cores, by a deposition technique, comprising the steps of: depositing a layer of a pourable composite material containing particles with a binder material coating, into a process area of a defined length and width fitting to the dimensions of a part to be manufactured; applying a moderating agent onto said composite material layer in a selective sub-area of said process area; inducing energy to solidify said selective sub-area, respectively the area of said process area void of said moderating agent; repeating the aforementioned steps; and separating of solidified composite material from non-solidified composite material.

27 Claims, 1 Drawing Sheet

METHOD FOR MANUFACTURING OF PARTS BY A DEPOSITION TECHNIQUE

This invention relates to a manufacturing method for parts, especially molds or cores for models, by a deposition technique.

An conventional manufacturing process for metal casting molds and cores uses so-called Croning Sand a granular material consisting of resin-coated sand particles, e.g. quartz or zirconia—which is filled into frames, thereby forming a negative cavity of a positive model which beforehand has been inserted into the frame space and subsequently embedded in Croning Sand. Usually, the complete Croning Sand filling of the frame will be bonded together by a simple heating process.

Manufacturing of the positive model can be accomplished by traditional manual tooling methods or by CAD assisted processes like numerically controlled milling or turning. Today, for manufacturing complex molds or cores for prototypes or even small runs of cast metal parts, Selective Laser Sintering (SLS) according to WO 80/02677 can be applied. For SLS a sintering material, i.e. a particulate metallic material, is being spread in a thin layer, a switchable laser beam scans across the particle layer and selectively bonds particles together by heating them just beyond their melting point. This process is repeated layer after layer to build a three-dimensional part. The layer wise building process allows for complex shapes with features like hollow spaces and undercuts, which would be impossible to manufacture by traditional methods. Inherent disadvantages of the SLS method are the complexity of such a machine with laser scan technique, and the volume restriction of parts, caused by the limited laser scanning area.

EP-0 431 924 B1 suggests a method for layer-wise manufacturing of three-dimensional models by a deposition technique in combination with selective curing. In this method, a layer of particulate material is being deposited in a limited area. By selectively applying a binder material a predetermined area of the particle layer is being bonded together and to the underlying layer produced in the previous cycle. These steps are repeated a predetermined number of times. In a last step, the particulate material which has remained unwetted by the binder material and therefore unbonded, is being removed. The particulate material could be e.g. quartz powder, the binder some kind of resin. The binder material is cured either by radiation, application of a gaseous substance, or by simple chemical reaction.

In the above mentioned method, the applied binder material must be transported to the contact surface of the particles in the uppermost layer as well as to the contact surfaces of the particles or the uppermost layer facing the particles of the previously applied layer. This is mandatory to achieve the correct shape of the cured uppermost layer and a tight bond to the underlying layer.

In order to achieve a sufficiently stable bond between the individual particles and thereby a sufficiently stable part, a relatively large amount of binder material must be applied. This is because a high fraction of the applied binder material fills the cavities between the particles instead of remaining in the contact areas between neighbouring particles where it is supposed to develop its binding function. Thus, the structure must be supplied with a very large amount of binder material, which will make up a high fraction of the total mass of the finished part. This fraction is about twice as high as with conventional model manufacturing techniques for molds or cores. A high fraction of binder material in the finished part causes significant disadvantages. If a part is used as a mold or core, e.g. for metal casting applications, the binder material will gasify almost completely during the casting procedure. Most of the binder material will migrate into the solidifying cast metal body, thereby producing voids. These voids can contaminate the part or model and most probably weaken its mechanical strength.

Moreover, the application of binder material like resin requires very sophisticated dosing systems because of its high viscosity and low surface tension. Especially resin types which are suited for metal casting because of their low tendency to produce voids can be applied by microdosing systems only with extremely high effort, reduced reliability and quality, or not at all.

It is an object of the present invention to devise a simple and cost-effective rapid prototyping method for manufacturing of parts, characterized by—compared with the method suggested in EP 0 431 924 B1—a significantly reduced fraction of binder material in the finished part, the usability of binder materials with low tendency for void generation during casting, and to make parts by this method.

According to the present invention the method for manufacturing of parts, more specifically molds or cores, is accomplished by a deposition technique. In a first step, a first layer of a pourable composite material containing particles with a binder material coating, is being deposited in an area whose length and width fit to the dimensions of the part being manufactured. In a next step, a moderating agent is applied to a selective sub-area of the composite material. The moderating agent shifts the level of specific energy necessary for bonding the composite material together by melting or chemical reaction of the binder material; this shift takes place from a start level to a discrete higher or—preferentially—lower level. Subsequently, energy is induced (introduced or released) with a level of specific energy between the start level and the other level. The energy input causes solidification of the selective sub-area resp. of the sub-area which is void of the moderating agent. The steps of layer deposition, moderating agent application, and energy induction are repeated a certain number of times. Depending on the desired shape of the part, a different sub-area for moderating agent application is selected for each cycle. In a last step, the solidified composite material is separated from non-solidified composite material.

The use of a pourable composite material with a binder coating on each particle for making parts ensures that binder material is present at each contact area of neighbouring particles immediately after deposition. Therefore, no fluid mechanical conditions, e.g. surface tension, must be dealt with like during binder material application, which would transport a large amount of binder material to undesirable places. Therefore, the danger of filling voids between particles significantly or completely and thereby increasing the fraction of binder material in the finished workpiece, is not present. Rather, the amount of binder material in the finished workpiece is given by the original composition of the composite material, because the binder material is introduced as a component of the composite material as a thin coat covering the surface of the particles.

By selective application of the moderating agent and subsequent energy induction, as well as repetition of the steps a) to c) in claim 1, the desired model, more specifically a metal casting mold or core, is being manufactured by a layer-wise deposition technique. Direct control by CAD data processing allows for rapid, fully automatic, and highly precise manufacturing of complex shapes, especially with undercuts.

Depending on the energy level shift by application of the moderating agent, the layer is being bonded together in that sub-area of the layer deposition area where the agent was applied if the specific energy shift for melting or inducing a chemical reaction is negative, and, vice versa, the untreated layer deposition area will be bonded together if the specific energy shift by applying the agent is positive. Accordingly, the desired part will arise either in the sub-area treated with moderating agent or in the remaining untreated layer deposition area.

Moderating agents in the sense of this invention are substances which are suitable for locally modifying the volume specific amount of energy necessary for bonding of the composite material.

By using such a kind of moderating agent selective bonding can be achieved by relatively simple and cost-effective means, that is selective application of a substance and global induction of a defined amount of energy.

According to the present invention, the composite material may contain metal particles, plastics, ceramics, minerals, or similar substances. The preferred composite material for deposition is Croning Sand, especially Croning Sand with a phenole-formaldehyde resin, e.g. Novolak or Resol, as binder material. Croning Sand is cost-effective and characterized by an especially suitable ratio between particle and binder material. For manufacturing of metal casting molds and cores a process using Croning Sand is the first choice.

According to the present invention, the composite material layer may be deposited with a thickness in the order of one particle size, or with a thickness of several centimeters. The preferred composite material layer is deposited with a thickness between 0.1 and 2 millimeters. By selecting such a layer thickness the achievable building speed can be maximized, especially if a liquid moderating agent is applied. Thicker layers cause a greater total building time because of the long delay necessary for full penetration of the moderating agent, thin layers demand a greater number of layers to be manufactured.

As a rule, the total building time will decrease with increasing layer thickness. The geometric resolution of the manufactured part will decrease accordingly.

Preferably, the layer thickness is varied depending on the complexity of the generated pattern and/or the amount of geometric differences between subsequent layers. If, for instance, the curing pattern for a multitude of subsequent layers is identical, then the total building time can be reduced by increasing the layer thickness without loss of precision.

An easily dosable liquid is preferred as moderating agent.

According to the present invention a substance can be applied as a moderating agent it it causes an appropriate physical, chemical, or biological effect leading to a modification of the volume specific amount of energy needed for solidification of the composite material. As a moderating agent, a substance which inhibits or promotes (especially as a catalyst) the solidification, is preferred.

According to the present invention it is possible to induce energy without effecting a phase change in the applied moderating agent. Preferentially, energy is introduced and a fraction of the energy—by means of the moderating agent—removed locally through melting or evaporating.

According to the present invention the moderating agent can be applied as a powder-like substance or as mixture of a liquid with solid particles, e.g. a suspension. Preferentially a liquid is applied as a moderating agent. Furthermore, an alcohol or, especially on acid, more specifically hydrochloric acid is preferred as moderating agent for application. Using these liquids leads to extraordinarily tight bonds, especially if Croning Sand is used as composite material.

According to the present invention the moderating agent can be applied with a brush, a roller, a blade, a spraying device, or deposited in plate form. Preferentially the moderating agent is printed in form of small droplets. For this purpose customary ink-jet printing systems, e.g. piezoelectric, bubble-jet, or continuous jet systems, can be used. A piezoelectric printing process is preferred.

According to the present invention the method can be used for manufacturing of regular parts, e.g. design models. The method is preferred for manufacturing of metal casting molds or cores.

The task of manufacturing a part according to this invention is accomplished with the method described in claim 10.

Figure 2:
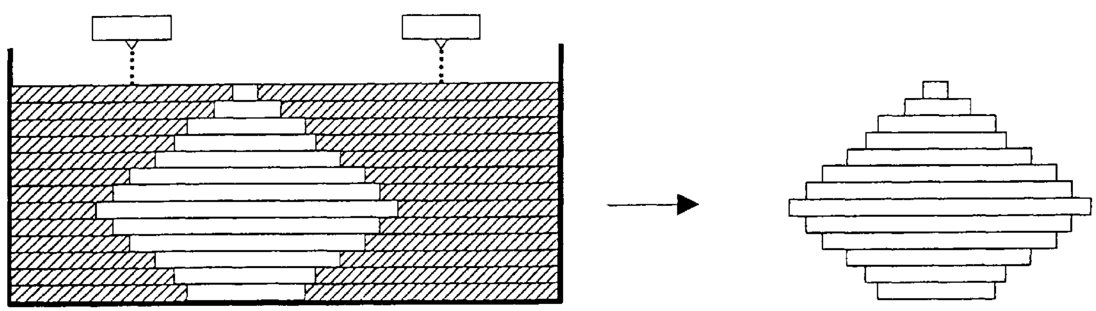

Preferred embodiments of the invention are described with reference to the drawings. In the drawings:

FIG. 1 shows the principle of one embodiment of a method according to the invention, in which material is bonded together and hereby a part being built; and FIG. 2 shows the principle of another embodiment of a method according to the invention, in which the moderating agent is applied in that sub-area of the layer deposition area where the particle material is not bonded together.

From FIG. 1 the principle of one embodiment of a method according to the invention can be derived. On the left hand side the appearance of the layered structure generated by the method is depicted before removal of the unbonded particle material. The right hand side shows the shape of the manufactured part after removal of the unbonded particle material.

In this depicted embodiment of the method according to the invention the moderating agent is applied to that sub-area of the layer deposition area in which the particle material is bonded together and hereby a part being built.

The left hand part of the figure shows material deposited in a layer-wise fashion in an area confined by the walls of a container. The individual layers are delimited by horizontal lines which represent the borders between adjacent layers. Hatched areas represent sub-areas of layers where moderating agent has been applied. The applied moderating agent is of the type which lowers the specific energy necessary for melting or inducing a chemical reaction of the binder material on order to solidify the composite material from an original value to a discrete other value. By inducing energy with a specific energy between an original value and the other value, those sub-areas have been solidified in which the moderating agent has been applied.

From FIG. 2 the principle of another embodiment of a method according to the invention is made clear. Also in FIG. 2 the left hand part depicts the appearance of the layered structure generated by the method before removal of unbonded particle material, and the right hand part depicts the shape of the finished part after removal of unbonded particle material.

In the embodiment of a method according to the invention as depicted in FIG. 2 the moderating agent is applied to that sub-area of the layer deposition area in which the particle material remains unbonded; ergo this represents the particle mass surrounding the part, or in other words, makes up the negative, or complementary image of the part.

In the left hand part of FIG. 2, in analogy to FIG. 1, material has been deposited in a layer-wise fashion in an area confined by the container walls. The individual layers are delimited by horizontal lines which represent the borders between adjacent layers. Hatched areas represent sub-areas of layers where moderating agent has been applied. The applied moderating agent is of the type which raises the specific energy necessary for melting or inducing a chemical reaction of the binder material on order to solidify the composite material from an original value to a discrete other value. By inducing energy, whose specific energy lies between an original value and the other value, those sub areas have been solidified in which no moderating agent has been applied.

What is claimed is:

1. A method for the manufacturing of parts by a deposition technique, comprising the steps of:

(a) depositing a layer of a pourable composite particle material containing binder precoated particles into a process area of a defined length and width fitting to the dimensions of a part to be manufactured, said binder material coating requiring a starting value of specific energy to be induced for binding and solidifying the composite material;

(b) selectively applying a moderating agent onto said composite material layer in a selective sub-area of said process area while keeping a remaining area outside said sub-area free of the moderating agent, thereby selectively modifying the specific energy to be induced in one of said sub-area and said remaining area from said starting value to a discrete different value;

(c) globally inducing energy in said layer of composite material with a level of specific energy between said starting value and said discrete different value, thereby effecting a selective solidification of the composite material of the selected one of said sub-area and said remaining area;

(d) repeating steps (a) to (c); and (e) separating solidified composite material from non-solidified composite material.

2. A method as set forth in claim 1 wherein Croning Sand is deposited as composite material.

3. A method as set forth in claim 1, wherein said layer of said composite material is being deposited with a thickness between 0.1 and 2 millimeters.

4. A method as set forth in claim 1, wherein the thickness of said layer is being varied from layer to layer.

5. A method as set forth in claim 1, wherein a moderating agent is applied which acts as an inhibiting agent on said solidification.

6. A method as set forth in claim 1, wherein a fraction of the introduced energy is being removed locally.

7. A method as set forth in claim 1, wherein energy is being released by a chemical reaction of said moderating agent.

8. A method as set forth in claim 1, wherein a liquid, is used as moderating agent for application.

9. A method as set forth in claim 1, wherein said energy is induced by heat radiation.

10. A method as set forth in claim 1, wherein said moderating agent is applied by means of an ink jet printing process.

11. Method for manufacturing of a casting mold or a casting core as set forth in claim 1.

12. A method as set forth in claim 1, wherein said specific energy is modified by decreasing and the sub-area is solidified.

13. A method as set forth in claim 1, wherein said specific energy is modified by increasing and said remaining area is solidified.

14. A method as set forth in claim 1, wherein in step (d) a different selective sub-area is used.

15. A method as set forth in claim 4, wherein the thickness is varied depending on the geometrical complexity of the layers to be built.

16. A method as set forth in claim 4, wherein the thickness is varied depending on the amount of change between subsequent layers.

17. A method as set forth in claim 5, wherein a moderating agent is applied which acts as a catalyst.

18. A method as set forth in claim 6, wherein the energy is removed by melting.

19. A method as set forth in claim 6, wherein the energy is removed by evaporating said moderating agent.

20. A method as set forth in claim 8, wherein said liquid is an alcohol.

21. A method as set forth in claim 8, wherein said liquid is an acid.

22. A method as set forth in claim 21, wherein said acid is hydrochloric acid.

23. A method as set forth in claim 10, wherein said ink jet printing process is an ink jet printing process using piezo-electric techniques.

24. A method as set forth in claim 1, wherein said parts are molds.

25. A method as set forth in claim 1, wherein said parts are cores.

26. A method as set forth in claim 11, wherein the specific energy is modified by melting of said moderating agent.

27. A method as set forth in claim 11, wherein the specific energy is modified by chemical reaction of said moderating agent.

* * * * *